United States Patent
Meyer (10) Patent No.: US 8,693,562 B2
(45) Date of Patent: Apr. 8, 2014

(54) METHOD FOR RECEIVING TWO DECORRELATED SIGNALS TRANSMITTED ON A SINGLE CHANNEL AND RECEIVER FOR IMPLEMENTING SAID METHOD

(75) Inventor: Jacques Meyer, Saint-Martin-le-Vinoux (FR)

(73) Assignee: STMicroelectronics S.A., Montrouge (FR)

( * ) Notice: Subject to any disclaimer, the term of this patent is extended or adjusted under 35 U.S.C. 154(b) by 2225 days.

(21) Appl. No.: 10/845,471

(22) Filed: May 13, 2004

(65) Prior Publication Data

US 2005/0157817 A1 Jul. 21, 2005

(30) Foreign Application Priority Data

May 14, 2003 (FR) ...................................... 03 05749

(51) Int. Cl.
*H04L 5/12* (2006.01)

(52) U.S. Cl.
USPC ........... 375/264; 375/297; 375/316; 375/324; 375/229; 375/232; 375/350

(58) Field of Classification Search
USPC .................. 375/316, 297, 324, 229, 232, 350
See application file for complete search history.

(56) References Cited

U.S. PATENT DOCUMENTS

| | | | | |
|---|---|---|---|---|
| 5,502,507 | A * | 3/1996 | Kim .............................. | 348/607 |
| 5,900,778 | A * | 5/1999 | Stonick et al. ................ | 330/149 |
| 5,966,412 | A | 10/1999 | Ramaswamy | |
| 6,836,517 | B2 * | 12/2004 | Nagatani et al. .............. | 375/296 |
| 6,853,246 | B2 * | 2/2005 | Bauder et al. ................. | 330/149 |
| 7,184,473 | B2 * | 2/2007 | Chen et al. .................... | 375/229 |
| 7,245,671 | B1 * | 7/2007 | Chen et al. .................... | 375/316 |
| 2003/0202615 | A1 * | 10/2003 | Bach et al. .................... | 375/296 |
| 2003/0224723 | A1 * | 12/2003 | Sun et al. ..................... | 455/12.1 |
| 2004/0208259 | A1 * | 10/2004 | Hunton ......................... | 375/296 |
| 2005/0101254 | A1 * | 5/2005 | Sasaki et al. ................. | 455/63.1 |

FOREIGN PATENT DOCUMENTS

| | | |
|---|---|---|
| EP | 1 335 512 A2 | 8/2003 |
| EP | 1 361 686 A1 | 11/2003 |
| WO | 01/39456 A1 | 5/2001 |

OTHER PUBLICATIONS

Hunton, "Additive Digital Predistortion Using the Cordic Algorithm," U.S. Appl. No. 60/463,228, filed Apr. 16, 2003.
Moretti, M. et al., "Performance Evaluation of a Mobile Communication System Implementing the Dual-Signal Receiver," IEEE Vehicular Technology Conference, pp. 482-486, Sep. 19-22, 1999.

* cited by examiner

*Primary Examiner* — Dhaval Patel
(74) *Attorney, Agent, or Firm* — Seed IP Law Group PLLC (57) ABSTRACT

A process receives a composite signal transmitted via a nonlinear data transmission channel, with the composite signal having a first signal UL and a second signal LL. The process includes the following: demodulating and decoding the first signal UL by using a first demodulation and decoding chain in order to regenerate first information of the first signal UL; recoding and shaping to produce a continuous time waveform; applying a nonlinearity function based on a set of coefficients updated according to an adaptive correlation calculation process to the continuous time waveform; subtracting the result of the nonlinearity function from the composite signal in order to generate a result E; and demodulating and decoding the result E by using a second demodulation and decoding chain in order to regenerate second information of the second signal LL.

28 Claims, 6 Drawing Sheets

METHOD FOR RECEIVING TWO DECORRELATED SIGNALS TRANSMITTED ON A SINGLE CHANNEL AND RECEIVER FOR IMPLEMENTING SAID METHOD

BACKGROUND OF THE INVENTION

1. Field of the Invention

The present disclosure relates generally to the field of telecommunications and in particular but not exclusively to a method for receiving two decorrelated signals transmitted on a single channel.

2. Description of the Related Art

Transmission band requirements increase with the development of telecommunications.

Generally, the transmission band of a given communication channel is increased by increasing bit loading on a digital data transmission channel according to a given modulation pattern defining a finite set of complex points or information-carrying symbols. In Phase Shift Keying modulation, a set of complex points distributed on the same circle is defined. While the simplest version, known as Binary Phase Shift Keying (BPSK), makes it possible to transmit 1 bit per symbol, QPSK can simultaneously transmit two bits, and 3 bits can be obtained with 8QPSK modulation and 4 bits with 16QPSK modulation.

Quadrature Amplitude Modulation makes it possible to further increase transmission rates by means of a bigger constellation by operating at the same time a phase and shift modulation. A 16QAM or 64QAM modulation makes it possible to increase the transmission rate up to 4 or 6 information bits respectively, especially when associated with an efficient error correcting code system.

Figure 1:
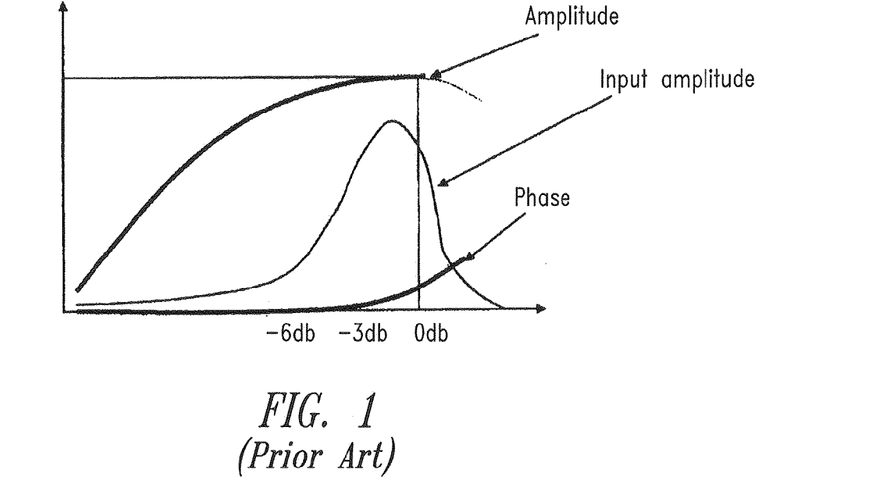
FIG. 1 represents a typical curve of a nonlinearity of a traveling wave tube (TWAT) typically used in the electronics loaded on to a satellite.

However, QAM techniques cannot be implemented when a data transmission channel suffers from latent nonlinearity as occurs in some situations, and in particular in satellite transmissions. As everybody knows, the electronics loaded on to a satellite are subjected to strict constraints of operation, and in particular to minimal power consumption as they are powered by solar cells. Thus, traveling wave tubes that are loaded onto satellites operate in saturated mode in order to minimize electronic current consumption. Nonlinearity is then very important, as illustrated in FIG. 1 where X-coordinates show the amplitude of an input signal of a transponder. On Y-coordinates, the curves respectively represent the output amplitude and its statistical distribution as well as the phase curve of the output signal of the transponder. As can be clearly seen, around the saturation point set to 0 dB, the transponder has a saturation corresponding to a maximum amplitude of the output signal of this transponder.

Figure 2:
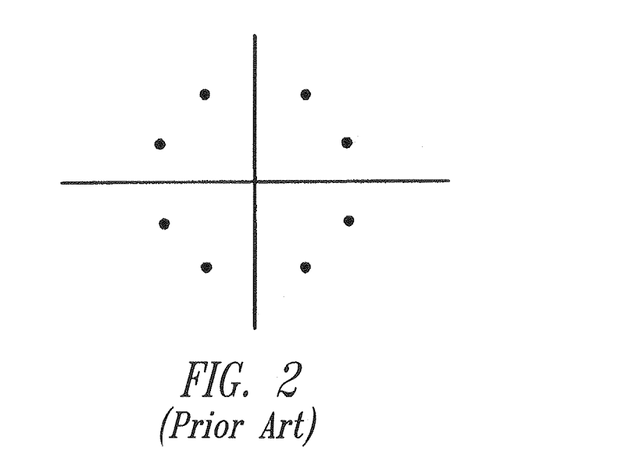
FIG. 2 illustrates the principle of an 8-state phase shift keying allowing simultaneous transmission of three information bits.

In the presence of such nonlinearity, it is not possible to resort to constellations and performances of QAM-type constellations. The choice is then confined to simpler modulation patterns, compatible with the nonlinearity affecting the data transmission channel, and in particular to modulation phase shift keying or MPSK. In practice, for satellite transmission, one hardly exceeds the performances of an 8PSK modulation (such as shown in FIG. 2), which corresponds to loading of three information bits.

To increase rate, other alternative techniques should be considered.

BRIEF SUMMARY OF THE INVENTION

A purpose of an embodiment is to overcome the limitations arising from the nonlinearity of some data transmission channels that, in addition, is likely to vary in time.

An aspect provides a technique making it possible to increase the flow in a nonlinear data transmission channel and to provide an alternative solution to QAM-type modulations.

Another aspect includes carrying a method for receiving, via a single channel affected by nonlinearity, first and second data flows transmitted according to a MPSK-type modulation pattern, with a device for automatically adjusting parameters according to the nonlinearity of the channel.

An aspect includes a method for receiving a composite signal transmitted via a nonlinear data transmission channel according to a modulation pattern using a given constellation comprising a first signal UL and a second signal LL.

The process comprises the following:
demodulating and decoding said first signal UL by means of a first demodulation and decoding chain in order to regenerate said first information UL;
from said first regenerated information UL, recoding a set of symbols $z=x+jy$ representative of said constellation used for transmission and, shaping to rebuild a continuous time waveform of said reconstituted symbols;
applying a nonlinearity function to said continuous time waveform;
subtracting the result of said nonlinearity function from the composite signal to generate a result E; and
demodulating and decoding said result E by means of a second demodulation and decoding chain in order to regenerate said second information LL.

In one embodiment, the nonlinearity function is realized by means of a look-up table comprising p $C_n(k)$ coefficients, with k=1 to p, which are updated according to an adaptive process based on a correlation calculation between the result E of said subtraction and said continuous time waveform.

In this manner, both information UL and LL can be decoded without knowing precisely the nonlinearity that affects the data transmission channel. This also allows the method to work even when the internal characteristics of the channel vary in time.

The coefficients of the look-up table will be arranged more densely around the saturation point of the data transmission channel in order to benefit from the greatest precision around this point.

In a particular embodiment, said $C_n(k)$ coefficients of the nonlinear function are applied by means of a double Cartesian-polar-Cartesian transformation comprising the following:
transforming said input signal into polar coordinates to determine module and phase of said input signal;
applying the amplitude response $F(\rho)$ and the phase response $\theta(\rho)$ corresponding to the $C_n(k)$ coefficient to be used;
submitting the result to a polar/Cartesian conversion.

In one embodiment, the current coefficient $C_n(k)$ used for said nonlinearity function is updated according to the following mechanism:

$$C_{n+1}(k)=C_n(k)+\mu E z^*$$

where
$\mu$ is a time constant, E is the result of said subtraction and $z^*$ is the conjugate complex number of said symbol $z=x+jy$.

Alternatively, the calculating time could be reduced by directly addressing the look-up table from value $x^2+y^2$ instead of the value of the module of z.

The process finds direct application in a satellite transmission of a composite signal comprising primary information UL that can be received and processed by a great number of television receivers and secondary information LL that can be received and processed by a subcategory of receivers.

An aspect also provides a digital communication system receiver for receiving and processing a composite signal comprising a first signal UL and a second signal LL. The receiver comprises:

a first chain of demodulation and decoding for demodulating and decoding said first signal UL in order to regenerate said first information UL;

recoding and shaping means for regenerating a continuous time waveform of said reconstituted symbols;

a nonlinearity function applied to said continuous time function;

means for subtracting the result of said nonlinearity function from said composite signal in order to generate a result E; and a second chain of demodulation and decoding for demodulating and decoding said result E in order to regenerate said second information LL.

Like for the method, the receiver comprises a set of coefficients that are updated according to calculation of the correlation between the results E of said subtraction and said continuous time waveform, according to the mechanism defined below:

$$C_{n+1}(k)=C_n(k)+\mu E z^*$$

where $\mu$ is a time constant, E is the result of said subtraction and $z^*$ is the conjugate complex number of said symbol $z=x+jy$.

The receiver can be used with any communication system intended for a nonlinear channel, and in particular for a television receiver transmitted by satellite way by traveling wave tubes.

BRIEF DESCRIPTION OF THE DRAWINGS

Other features of embodiments will appear when reading the following description and accompanying drawings, only given by way of nonrestrictive examples. In the drawings.

DETAILED DESCRIPTION

Embodiments of a method for receiving two decorrelated signals transmitted on a single channel and a receiver for implementing the method are described herein. In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 3:
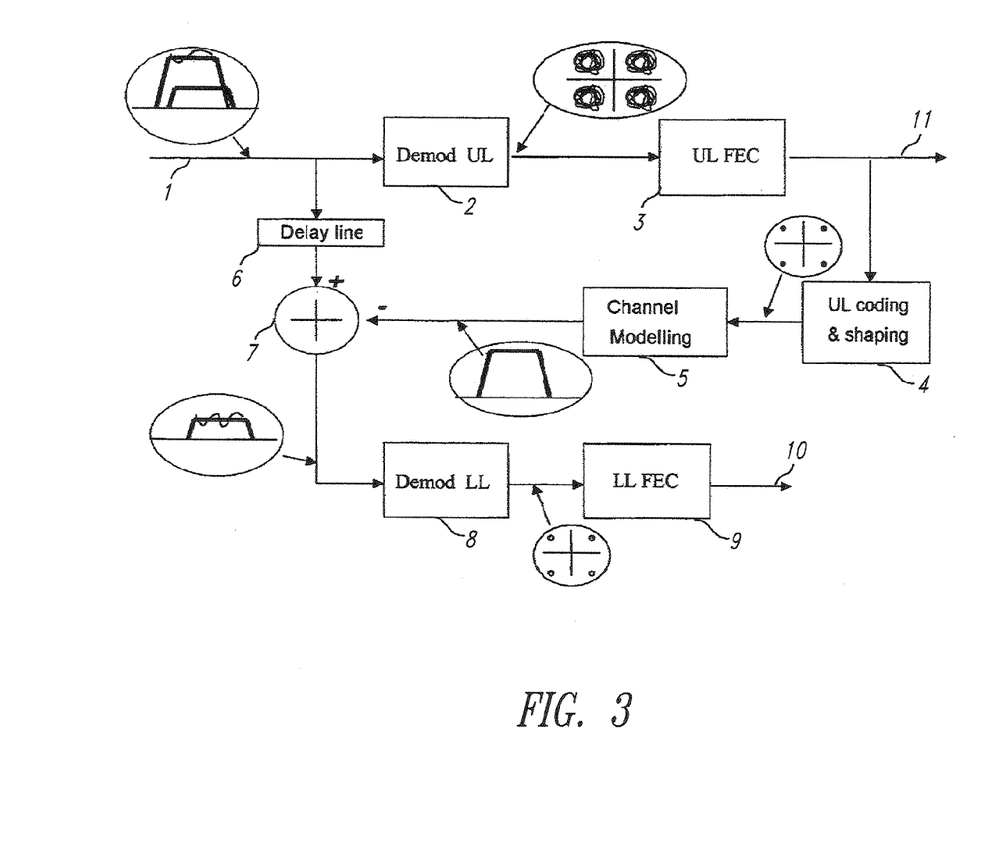
FIG. 3 illustrates an embodiment of a circuit receiving two signals transmitted simultaneously on a single nonlinear data transmission channel, using an adaptive compensating circuit.

In reference to FIG. 3, an embodiment of a circuit for receiving a composite signal comprising two information data transmitted simultaneously on a single nonlinear data transmission channel is now described It will be noted that the receive circuit described hereafter is particularly adapted for receiving a composite signal transmitted by satellite. In a given embodiment, the composite signal is composed of a first signal UL (Upper Layer)—having a higher amplitude—and a second signal LL (Lower Layer) having a lower amplitude. Typically, signal UL is the predominating signal of the first information such as a televised message intended to be received and processed by all categories of television systems whereas second signal LL carries a second information that only a particular subcategory of the television systems will be able to decode.

Generally, the first and second information signals UL and LL are unspecified information signals that are however selected so that they are not related.

As can be seen in FIG. 3, the receive circuit—which could be electronics positioned on Earth—comprises a first chain of demodulation making it possible to process the received composite signal (represented by reference 1). This first demodulation chain is composed of an UL demodulator 2 associated with an UL forward error correction circuit FEC 3. Demodulator 2 and forward error correction circuit 3 are circuits known from people qualified in the art and will consequently not be further discussed. Generally, as is known by people qualified in the art, demodulator 2 is associated with an error-correcting code sufficiently powerful—such as Reed Solomon or even turbo-code for example, to compensate for the shortcomings of the data transmission channel and in particular to correct the disturbances emanating from the second information LL considered as "noise" by the demodulation chain 2-3.

Thus, the demodulation and error correction chain 2-3 makes it possible to eliminate this "noise" and, consequently, to regenerate the first information UL that is available on electrode 11 for example, and can be forwarded to any system receiving information UL.

The receive circuit of FIG. 3 further comprises a primary information UL recoding circuit. This recoding circuit is composed of an UL shaping coder 4 arranged to reconstitute the sequence of constellation symbols and to transform the constellation into a continuous time function having a given spectrum, as is realized in the transmitter. Shaping a physical signal from a sequence of symbols is an operation well known by people qualified in the art and will not be further developed. As people qualified in the art know, coding and shaping block 4 carries out a treatment similar to that used by the transmitter, according to the considered modulation pattern, for example 8PSK.

The continuous time signal generated by block 4 is then transmitted to a block 5 realizing a nonlinearity function and more specifically a nonlinear processing that is comparable with the one that affects the considered data transmission channel and, consequently, composite signal 1.

Generally, there are many different possible ways to model the channel's nonlinearity, and in particular when the characteristic curves of the traveling wave transponders are known from manufacturers.

Figure 4:
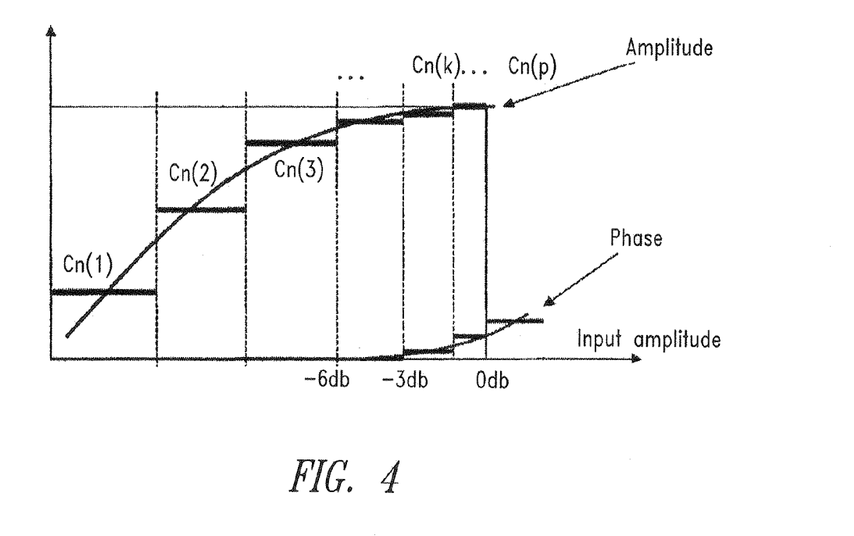
FIG. 4 illustrates an embodiment of block 5 of FIG. 3 for modeling of the nonlinearity function of the data transmission channel.

In one embodiment, such nonlinearity function is realized by means of a look-up table used to associate a given complex coefficient with a signal input amplitude value (that is to say the module of a complex number $|z|=|x+jy|$). As a result, nonlinearity is modeled by means of a successive approximation curve, as shown in FIG. 4. A set of p complex coefficients $C_n(k)$, with k=1 to p, correspond to "plateaus" approaching the amplitude and phase curve of the transponder.

Index n takes into account the coefficient variation in time by means of an adaptive process that will be described hereafter.

The various "plateaus" are distributed non-uniformly to reach maximum precision around the saturation point of the amplifier used in the satellite, as shown in FIG. 4.

The variation of coefficient $C_n(k)$ as a function of k, then as a function of n, will now be further developed.

1) Variation of Coefficients $C_n(k)$ with Index k

Coefficients $C_n(k)$ are corrected in such a way that the complex value of the nonlinearity output signal is equal to the input value multiplied by the $C_n(k)$ coefficient corresponding to the input module.

In FIG. 4, if $F(\rho)$ is the amplitude response and $\theta(\rho)$ the phase response, ideally factor C has $|C|=F(\rho)/|\rho|$ as a module—and not $F(\rho)$—and $\theta(\rho)$ as a phase, $\rho$ being the input module; this solution is selected because, as data are input and output in Cartesian coordinates (real part and imaginary part), one simply calculates a square of the module to choose the coefficient and then carries out a complex multiplication to obtain the output:

$$X+jY=C(x+jy).$$

Alternatively, coordinates can be polar-transformed, then the new module can be directly calculated by tabulating curve $F(\rho)$, and $\theta(\rho)$ is added to the argument (or multiplication by $\exp(j\theta(\rho))$ is carried out). Then, it is still possible to return to Cartesian coordinates but with a more important implementation cost because of the many calculations involved.

It will be noted that one can also work with first order development: instead of storing only C a coefficient C' is also kept, thus one has $X+jY=(C+C'\cdot dr)(x+jy)$ where dr is the difference between the measured squared module compared to the squared module of the center of the C(k) class.

The update of C is identical, and the update of C' is $$C'_{n+1}(k)=C'_n(k)+\mu'dr\cdot Ez^*.$$

In this way, it is possible to consider less table inputs, however at the price of a greater complexity.

The receive circuit further includes a subtracter 7 that receives the rebuilt, recoded and processed output signal from block 5, and the composite signal delayed by means of a delay line 6.

The output of subtracter 7 then provides a signal that, in theory, is free of the primary information UL and that can thus be used in a second demodulation and decoding chain to regenerate secondary information LL. This second chain comprises an UL demodulator 8 associated with a LL FEC block 9 comprising an error-correcting code similar to unit 2-3 of primary information UL demodulation chain.

2) Variation of Coefficients $C_n(k)$ with Index n

In one embodiment, the set of coefficients stored in the look-up table is constantly updated by means of an adaptive mechanism that makes it possible not to know the values of the internal characteristics of the nonlinear transponders used in satellites.

To this end, a servo loop is inserted in the adaptive mechanism for minimizing the correlation between two signals present in the receive circuit, and in particular the signal output from subtracter 7 and the signal output from nonlinear modeling block 5.

More specifically, the following correction mechanism is applied to calculate the new value $C_{n+1}(k)$ of a coefficient used by the mechanism at a given moment:

$$C_{n+1}(k)=C_n(k)+\mu Ez^*$$

where
  $\mu$ is a time-constant allowing a correction of the integral proportional type.
  E is the error signal at the output of subtracter 7 and $z^*$ is the conjugated complex of signal $z=x+jy$ rebuilt by block 4.

If the input signal of block 5 is: $z=x+jy$, block 5 outputs a value $Z=X+jY$, with $Z=C_n(k)\cdot z$ where $C_n(k)$ is the coefficient of the coefficient table corresponding to the value of the input module of z.

Generally, it is noted that the time-constant specific to this regulation mechanism is proportional to $\mu^*|z|^2$. Faster convergence of the mechanism is observed if $\mu$ decreases with the module of z.

Figure 5:
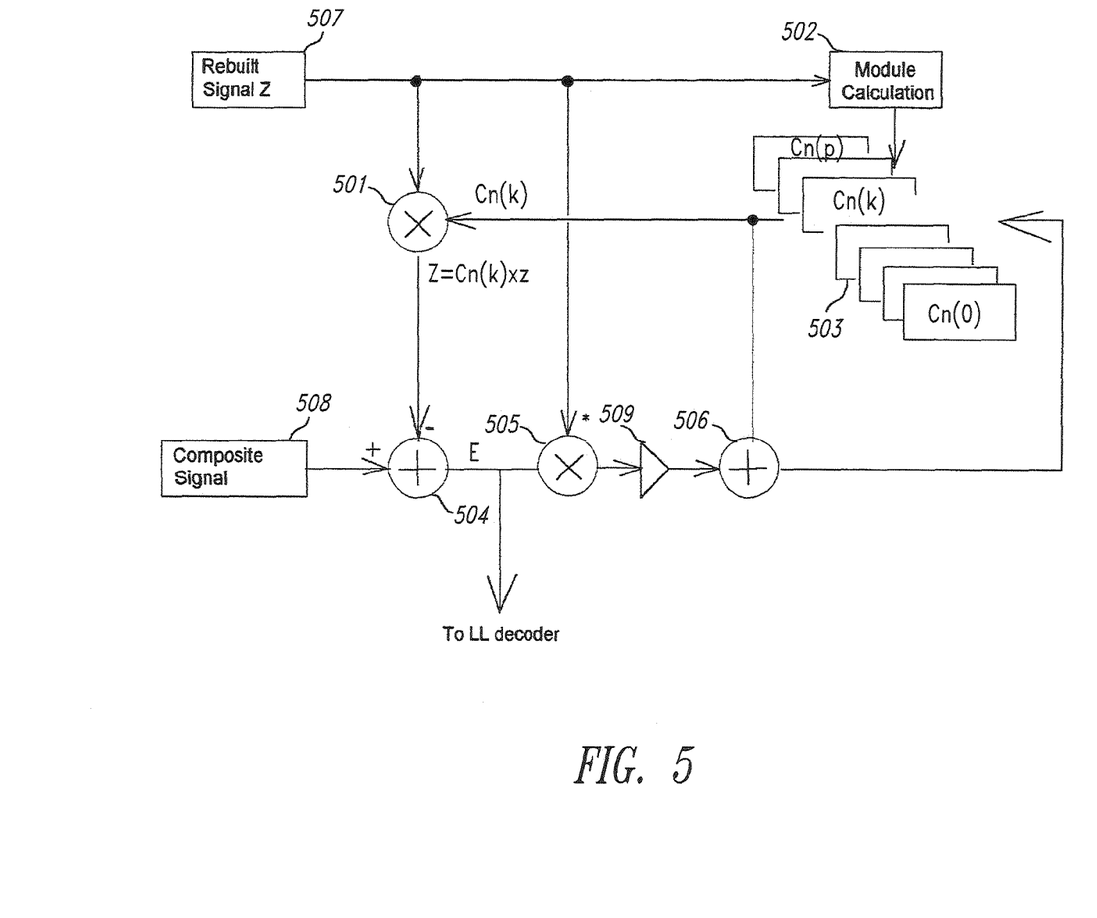
FIG. 5 illustrates an embodiment of the operation of the adaptive control of coefficients $C_n(k)$ used for the nonlinearity function of block 5.

An embodiment of the operation of the adaptive mechanism is more particularly illustrated in the synoptic diagram of FIG. 5. A block 507 provides the rebuilt signal z (after shaping by block 4) to a block 502 that carries out calculation of the module of z:

$$|z|=\sqrt{(x^2+y^2)} \text{ with } z=x+jy.$$

The value of the module is then used to select the value of k to be used to choose the complex coefficient $C_n(k)$.

A block 501 then multiplies this complex coefficient 501 by signal z in order to produce value Z according to the formula:

$$Z=C_n(k)\times z.$$

This value is then subtracted from the composite signal provided by block 508 by means of a subtracter 504 that then provides an error signal E that can be transmitted to LL decoder.

The same signal E is also transmitted to a multiplier 505 that receives the conjugated complex of signal z in order to carry out a correlation calculation:

$$E\times z^*.$$

The result is transmitted to an attenuator block 509 for multiplication by coefficient $\mu$, which result is then added to the current value $C_n(k)$ of the coefficient that was used in the servo loop. Thus, one carries out adaptive control of the value of the current coefficient $C_n(k)$ in order to calculate the new value $C_{n+1}(k)$ that will be then be loaded into the table.

Figure 6:
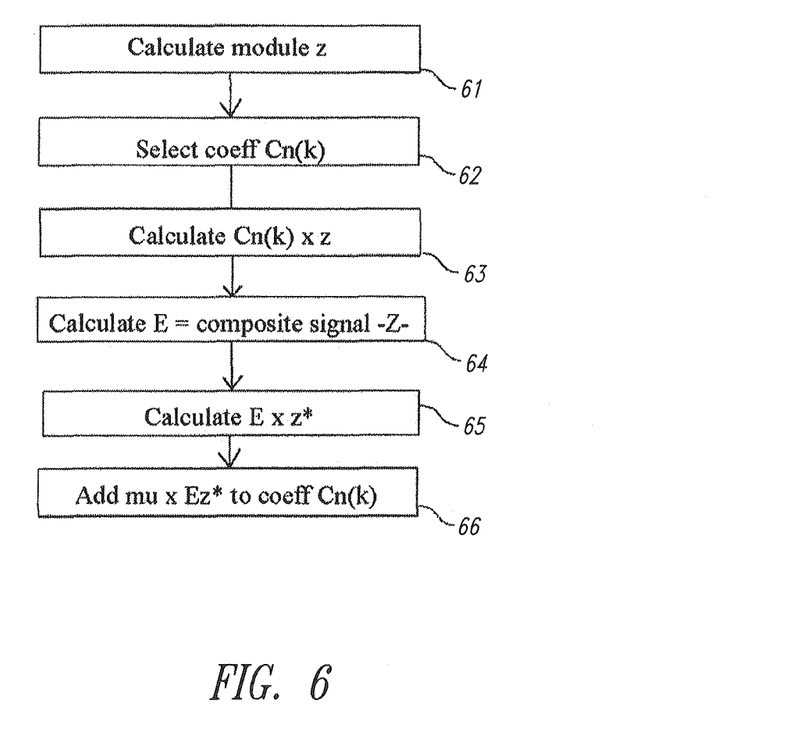
FIG. 6 illustrates the adaptive updating process of the set of coefficients of the look-up table used for the nonlinearity function.

FIG. 6 is an illustration of an embodiment of the adaptive mechanism according to an approach formalized according to a process. Initially, coefficients $C_n(k)$ are set to a preset value that can possibly come close to the average internal characteristics of the transponders used.

In step 61, module $|z|$ is calculated.

In step 62, the process then selects the Cn(k) coefficient corresponding to the calculated module |z|.

In step 63, the process calculates $C_n(k) \times z$ that is carried out by block 5.

In step 64, the process calculates the difference between the received composite signal and the output signal of block 5.

In step 65, the process calculates the correlation between signal z and error signal E: $E \times z^*$.

In step 66, the coefficient $C_{n+1}(k)$ is updated according to the formula:

$$C_{n+1}(k) = C_n(k) + \mu E z^*.$$

With the adaptive mechanism according to one embodiment of the present invention, one can operate an automatic adjustment of the parameters of the coefficients $C_n(k)$ calculated to minimize the correlation between two signals E and z, which ensures the adaptation of the mechanism even when the internal characteristics of the transponders vary with time.

In an embodiment, the mechanism of parameter value adjustment simultaneously corrects two or three consecutive parameters $C_n(k)$ and $C_n(k+/-1)$, with possibly different weightings within the look-up table implemented in block 5.

In another embodiment, instead of calculating module |z|, value $x^2+y^2$ is calculated directly, and this value is directly used to select the adequate coefficient $C_n(k)$. Thus, extraction of the square root is avoided, which reduces the processing time.

There is described now an improvement of the adaptive control of the coefficients $C_n(k)$ which was described above in relation with FIG. 5.

Indeed, it has been discovered that by applying non linearities in the adaptive control of coefficients $C_n(k)$ of FIG. 5, one increases the bandwidth of the spectrum through the generation of harmonics, and particularly odd harmonics. This might jeopardize the convergence process of the adaptive control.

Figure 7:
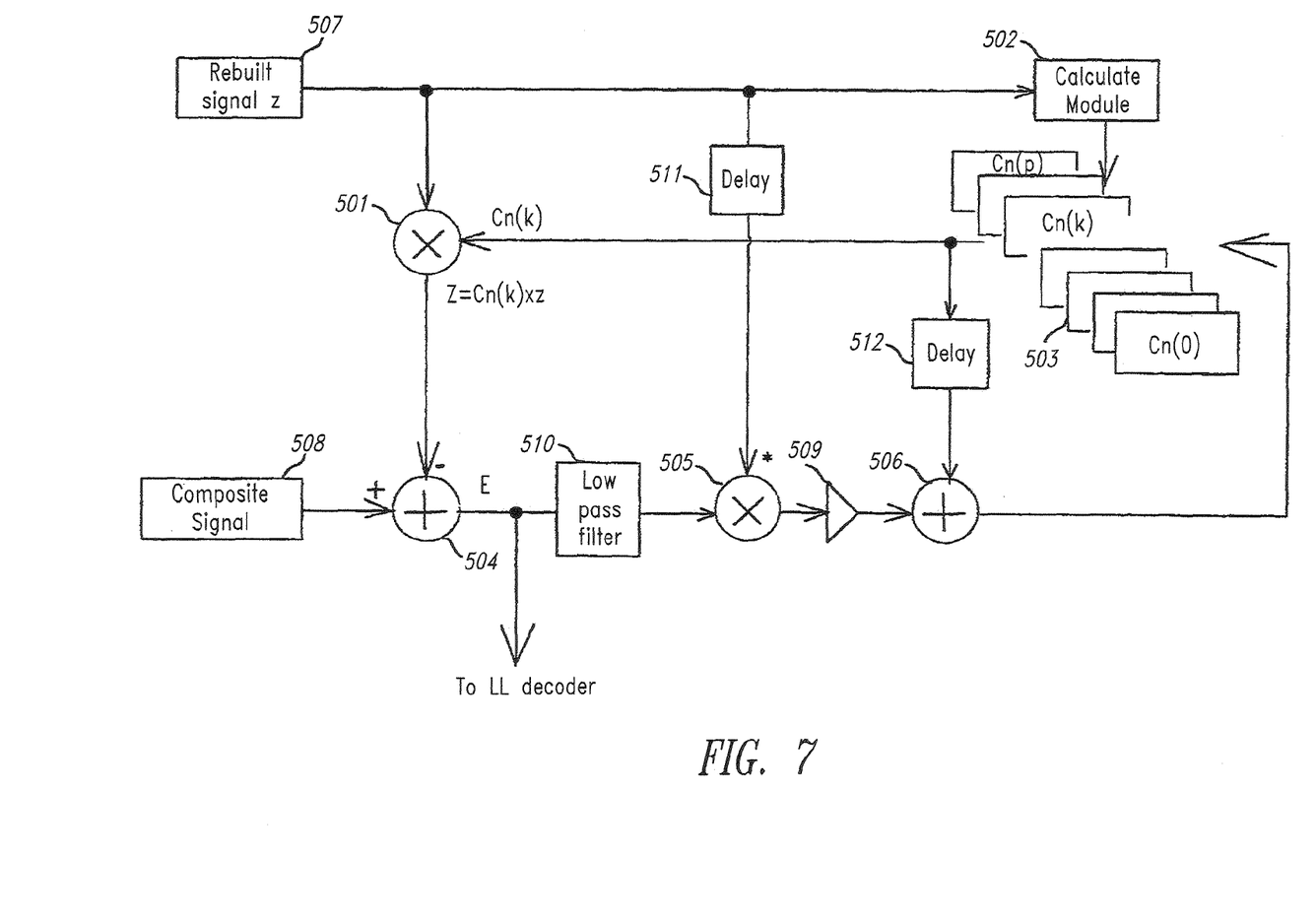
FIG. 7 illustrates an improvement brought to the adaptive control of coefficients $C_n(k)$ by means of a low-pass filtering inserted before the multiplier 505 of FIG. 5.

It is possible to improve that convergence process by inserting a low pass filter before applying the correlation as illustrated in FIG. 7, where it can be seen that a filter 510 is inserted between subtracter 504 and multiplier 505, which filter 510 is chosen to match the Nyquist function of the transmission channel. It should be noticed that elements 501 to 509 of FIG. 7 are identical to the same elements of FIG. 5 and, therefore, will not be further described.

Filter 510 introduces a low-pass filtering effect on the Error signal E before the latter is multiplied by the conjugate complex $z^*$ (as performed by step 65 of FIG. 6).

By means of filter 510, the correlation calculation is only performed on the part of the error signal E which is within the band of frequency which is used and this results in a convergence of the adaptive control of coefficients $C_n(k)$ to a set of more accurate values.

Filter 510 introduces an additional delay into the process of calculating the correlation and such additional delay has to be compensated for.

To achieve this, there is inserted a first delay element 511 between block 507 providing the reconstructed signal z and the second input of multiplier 505 receiving $z^*$.

A second delay element 512 is inserted on the coefficients $C_n(k)$ before the latter is inserted into the second path of adder 506.

The numerical values of delay elements 511 and 512 are selected in order to match the delay inserted by low-pass filter 510. Such determination is straightforward for the skilled man and will not be further developed.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for receiving a composite signal transmitted via a nonlinear data transmission channel according to a modulation pattern using a given constellation having a first signal UL and a second signal LL, the method comprising:
    demodulating and decoding said first signal UL by using a first demodulation and decoding chain in order to regenerate first information of said first signal UL;
    from said first regenerated information, recoding a set of symbols of complex number form $z=x+jy$ representative of said constellation used for transmission and, shaping to rebuild a continuous time waveform of said symbols;
    applying a self-adaptive nonlinearity function, which models a nonlinearity introduced into said composite signal by said transmission channel, to said continuous time waveform;
    subtracting a result of said nonlinearity function from said composite signal to generate a result E; and
    demodulating and decoding said result E by using a second demodulation and decoding chain in order to regenerate second information of said second signal LL, wherein said self-adaptive nonlinearity function uses an adaptive process based on a calculation which minimizes a correlation between said result E and said continuous time waveform, wherein said correlation is calculated according to said result E multiplied by $z^*$, wherein $z^*$ is a conjugated complex number of said z.

2. The method according to claim 1 wherein said nonlinearity function is realized by a look-up table having p coefficients $C_n(k)$, with k=1 to p, that are updated according to said adaptive process.

3. The method according to claim 2 wherein application of said nonlinear function $C_n(k)$ coefficients is carried out by a double Cartesian-polar-Cartesian transformation that includes:
    transforming said continuous time waveform into polar coordinates to determine a module and phase of said continuous time waveform;
    applying an amplitude response $F(\rho)$ and a phase response $\theta(\rho)$ corresponding to a $C_n(k)$ coefficient to be used; and
    submitting a result to a polar/Cartesian conversion.

4. The method according to claim 2 wherein said p coefficients in the look-up table are more densely distributed around a saturation point of the data transmission channel.

5. The method according to claim 2 wherein a current coefficient used for said nonlinearity function is updated according to:

$$C_{n+1}(k) = C_n(k) + \mu E z^*$$

where
μ is a time-constant, E is the result of said subtraction and z* is said conjugated complex number of said z=x+jy.

6. The method according to claim 5 wherein a low pass filtering is applied on the result E of said subtraction before E is multiplied by z*, and wherein two corresponding delay elements are respectively applied on z* and $C_n(k)$.

7. The method according to claim 2 wherein the coefficient $C_n(k)$ used in said nonlinearity function is directly determined from $x^2+y^2$.

8. The method according to claim 4 wherein two consecutive coefficients in said look-up table are simultaneously updated for each calculation of the correlation between the result E of said subtraction and said continuous time waveform.

9. The method according to claim 1 wherein the method is applied to transmission by satellite of said composite signal having said first information of said first signal UL that is received and processed by a number of television receivers and having said second information of said second signal LL that is received and processed by a subcategory of receivers.

10. A receiver for a digital communication system used to receive and process a composite signal transmitted via a nonlinear data transmission channel according to a modulation pattern using a given constellation having a first signal UL and a second signal LL, the receiver comprising:
a first demodulation and decoding chain to demodulate and decode said first signal UL in order to regenerate first information of said first signal UL;
a recoding and shaping block to obtain a set of symbols of complex number form z=x+jy representative of said constellation and to generate a continuous time waveform of said symbols;
a self-adaptive nonlinearity function, which models a nonlinearity introduced into said composite signal by said transmission channel, applied to said continuous time waveform;
means for subtracting a result of said nonlinearity function from said composite signal in order to generate a result E, wherein said self-adaptive nonlinearity function uses an adaptive process based on a calculation which minimizes a correlation between said result E and said continuous time waveform, wherein said correlation is calculated according to said result E multiplied by z*, wherein z* is a conjugated complex number of said z; and
a second demodulation and decoding chain to demodulate and decode said result E in order to regenerate second information of said second signal LL.

11. The receiver according to claim 10 wherein said nonlinearity function is realized by a look-up table having p coefficients $C_n(k)$ with k=1 to p that are updated according to said adaptive process.

12. The receiver according to claim 11 wherein a current coefficient used for said nonlinearity function is updated according to:

$$C_{n+1}(k)=C_n(k)+\mu Ez^*$$

where
μ is a time-constant, E is the result of said subtraction and z* is said conjugated complex number of said z=x+jy.

13. The receiver according to claim 12 wherein a low pass filtering is applied on the result E of said subtraction before E is multiplied by z*, and wherein two corresponding delay elements are respectively applied on z* and $C_n(k)$.

14. A method, comprising:
receiving a composite signal transmitted on a transmission channel and having first and second information signals;
demodulating and decoding the first information signal to regenerate first information contained therein;
coding a set of symbols of complex number form z=x+jy from the regenerated first information and building a waveform of the set of symbols;
applying a self-adaptive nonlinearity function, which models a nonlinearity introduced into said composite signal by said transmission channel, to the waveform;
using a result of the nonlinearity function and the composite signal to obtain an output, wherein said self-adaptive nonlinearity function uses an adaptive process based on a calculation which minimizes a correlation between said output and said waveform, wherein said correlation is calculated according to said output multiplied by z*, wherein z* is a conjugated complex number of said z; and
demodulating and decoding the output to regenerate second information of the second information signal.

15. The method of claim 14 wherein using the result of the nonlinearity function and the composite signal to obtain the output includes subtracting the result of the nonlinearity function from the composite signal to generate the output.

16. The method of claim 14 wherein the composite signal is transmitted via a nonlinear data transmission channel according to a modulation pattern using a constellation having the first and second information signals, and wherein coding the set of symbols and building the waveform includes coding the set of symbols representative of the constellation and building a continuous time waveform of the symbols representative of the constellation.

17. The method of claim 14 wherein applying the self-adaptive nonlinearity function includes using a plurality of coefficients in a lookup table that are updated according to said adaptive process.

18. The method of claim 17 wherein using the plurality of coefficients includes using coefficients that are closely distributed around a saturation point of a transmission channel in which the composite signal is transmitted.

19. The method of claim 17 wherein applying the self-adaptive nonlinearity function to the waveform includes:
transforming the waveform into polar coordinates to determine a module and phase of the waveform;
applying an amplitude response and a phase response corresponding to a coefficient to be used; and
providing a result of this application to a polar-Cartesian conversion process.

20. An apparatus, comprising:
a first set of elements to demodulate and decode a received first information signal, the first information signal being part of a composite signal transmitted through a transmission channel and also having a second information signal, to regenerate first information contained in the first information signal;
a coding and shaping block, coupled to the first set of elements, to respectively code a set of symbols of complex number form z=x+jy from the regenerated first information and to build a waveform of the set of symbols;
a channel modeling block, which models a nonlinearity introduced into said composite signal by said transmission channel, coupled to the coding and shaping block to apply a self-adaptive nonlinearity function to the waveform;

a unit coupled to the channel modeling block to use a result of the nonlinearity function and the composite signal to obtain an output, wherein said self-adaptive nonlinearity function uses an adaptive process based on a calculation which minimizes a correlation between said output and said waveform, wherein said correlation is calculated according to said output multiplied by $z^*$, wherein $z^*$ is a conjugated complex number of said z; and a second set of elements coupled to the unit to demodulate and decode the output to regenerate second information of the second information signal.

21. The apparatus of claim 20 wherein the unit includes a subtraction unit to subtract the result from the composite signal to generate the output.

22. The apparatus of claim 20 wherein the channel modeling block includes an element to use a plurality of coefficients that are updated according to said adaptive process.

23. The apparatus of claim 22 wherein the plurality of coefficients are stored in a look-up table.

24. The apparatus of claim 20 wherein the channel modeling block to apply the self-adaptive nonlinearity function to the waveform includes:
  a first element to transform the waveform into polar coordinates to determine a module and phase of the waveform;
  a second element to apply an amplitude response and a phase response corresponding to a coefficient to be used; and
  a third element to provide a result of this application to a polar-Cartesian converter.

25. A system for receiving a composite signal transmitted via a nonlinear data transmission channel according to a modulation pattern using a given constellation having a first information signal and a second information signal, the system comprising:
  a means for demodulating and decoding the first information signal to regenerate first information contained therein;
  a means for recoding a set of symbols of complex number form $z=x+jy$ representative of the constellation used for transmission from the regenerated first information and for building a continuous time waveform of the symbols;
  a means for applying a self-adaptive nonlinearity function, which models a nonlinearity introduced into said composite signal by said transmission channel, to the continuous time waveform;
  a means for subtracting a result of the nonlinearity function from the composite signal to generate an output, wherein said self-adaptive nonlinearity function uses an adaptive process based on a calculation which minimizes a correlation between said output and said continuous time waveform, wherein said correlation is calculated according to said output multiplied by $z^*$, wherein $z^*$ is a conjugated complex number of said z; and
  a means for demodulating and decoding the output to regenerate second information of the second information signal.

26. The system of claim 25 wherein the means for applying the nonlinearity function uses a plurality of coefficients in a lookup table that are updated according to said adaptive process.

27. The system of claim 25 wherein the means for applying the nonlinearity function includes:
  a means for transforming the continuous time waveform into polar coordinates to determine a module and phase of the continuous time waveform;
  a means for applying an amplitude response and a phase response corresponding to a coefficient to be used; and
  a means for providing a result of this application to a polar-Cartesian conversion process.

28. The system of claim 25, further comprising a means for transmitting the composite signal via satellite and for receiving the composite signal.

* * * * *